(12) United States Patent
MacLellan

(10) Patent No.: US 7,512,946 B2
(45) Date of Patent: Mar. 31, 2009

(54) SCHEDULING METHOD AND SYSTEM FOR CONTROLLING EXECUTION OF PROCESSES

(75) Inventor: Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 10/481,483

(22) PCT Filed: Mar. 21, 2002

(86) PCT No.: PCT/EP02/04290

§ 371 (c)(1),
(2), (4) Date: Mar. 2, 2005

(87) PCT Pub. No.: WO03/005136

PCT Pub. Date: Jan. 16, 2003

(65) Prior Publication Data

US 2005/0192750 A1     Sep. 1, 2005

(30) Foreign Application Priority Data

Jun. 29, 2001 (GB) ................................ 0115952.4

(51) Int. Cl.
*G06F 9/46* (2006.01)
*G06F 7/38* (2006.01)
*G06F 7/26* (2006.01)

(52) U.S. Cl. ................... 718/101; 718/102; 708/490; 708/853

(58) Field of Classification Search ............. 718/100, 718/101, 102, 103, 104; 708/3, 7, 490, 800, 708/853

See application file for complete search history.

(56) References Cited

U.S. PATENT DOCUMENTS 4,952,927 A    8/1990   DeLuca et al.

(Continued)

FOREIGN PATENT DOCUMENTS

EP    0578262    9/1993

(Continued)

OTHER PUBLICATIONS

"Applying Real-Time Scheduling Techniques to Software Processes: A Position Paper", A. Cass, Leon J. Osterweil, Proc. of the 8$^{th}$ European Workshop on Software Process Technology, Jun. 19-21, 2001, Witten, Germany.

(Continued)

*Primary Examiner*—Meng-Ai An
*Assistant Examiner*—Caroline Arcos
(74) *Attorney, Agent, or Firm*—Kenneth R. Corsello, Esq.; Blanche E. Schiller, Esq.; Heslin Rothenberg Farley & Mesiti P.C.

(57) ABSTRACT

A workload scheduler detects a long-running job when its duration exceeds a threshold value calculated by applying a multiplication factor to an estimated duration of the job. An operator inputs two extreme values of the multiplication factor, which consist of an upper level for the short-duration jobs and a lower level for the long-duration jobs. An algorithm then calculates the appropriate multiplication factor for any particular job, giving much more weight to the upper level when the estimated duration is small, but which gradually swings the levels to give more importance to the lower level when the estimated duration is long.

6 Claims, 4 Drawing Sheets

U.S. PATENT DOCUMENTS 5,627,938 A * 5/1997 Johnston .................. 704/200.1
6,618,742 B1 * 9/2003 Krum ........................ 718/100
6,944,862 B2 * 9/2005 Caggese et al. ............ 718/102

FOREIGN PATENT DOCUMENTS

| JP | 07006058 | 1/1995 |
|---|---|---|
| JP | 09244923 | 9/1997 |
| JP | 2000132428 | 5/2000 |

OTHER PUBLICATIONS

"An Evaluation of Parallel Job Scheduling for ASCI Blue-Pacific", H. Franke, et al., SC '99, Portland, OR.

* cited by examiner

SCHEDULING METHOD AND SYSTEM FOR CONTROLLING EXECUTION OF PROCESSES

The present invention relates to a scheduling method and system for controlling execution of processes.

Scheduling methods are commonly used in several applications, such as for managing a series of jobs in a batch processing. Typically, scheduling involves building a plan consisting of a flow of jobs structured in a specified sequence, which is used to submit and control their execution. The building of the plan requires a prediction of the expected duration of each job; for example, the estimated duration is set to an average of the measured durations of completed instances of the job executed previously.

When a job runs significantly longer than its estimated duration, a workload scheduler controlling running of the jobs detects a corresponding abnormal condition. In this situation it is desirable to alert an operator, who will decide whether or not it is necessary to intervene, for example by cancelling the long-running job. Alternatively, the scheduler invokes a workload manager for giving additional system resources to the job (if classified as critical).

A common approach is to specify a factor by which the estimated duration is multiplied. The resultant figure gives a threshold value for a current duration of the job; when the current duration exceeds the threshold value, the job will be considered long-running and a corresponding action will be taken.

A drawback of the solutions known in the art is that the detection mechanisms are crude and provide little value; as a consequence, the workload scheduler may operate incorrectly.

Particularly, if the threshold value is too low, false alarms are raised or the system resources are used indiscriminately, even if no real abnormal conditions have occurred. Conversely, if the threshold value is too high, long-running jobs are detected only after a very long time has passed.

It is an object of the present invention to provide a technique which alleviates the above drawbacks.

According to the present invention we provide a scheduling method for controlling execution of processes including the steps of estimating an expected duration of a process, determining a threshold value by applying a multiplication factor to the expected duration, running the process, detecting an abnormal condition when an actual duration of the process exceeds the threshold value, wherein the multiplication factor is determined as a decreasing function of the expected duration.

Also, according to the present invention we provide a computer program for performing the method, a program product storing the program, and a corresponding system.

Further features and the advantages of the solution according to the present invention will be made clear by the following description of a preferred embodiment thereof, given purely by way of a non-restrictive indication, with reference to the attached figures, in which.

Figure 1:
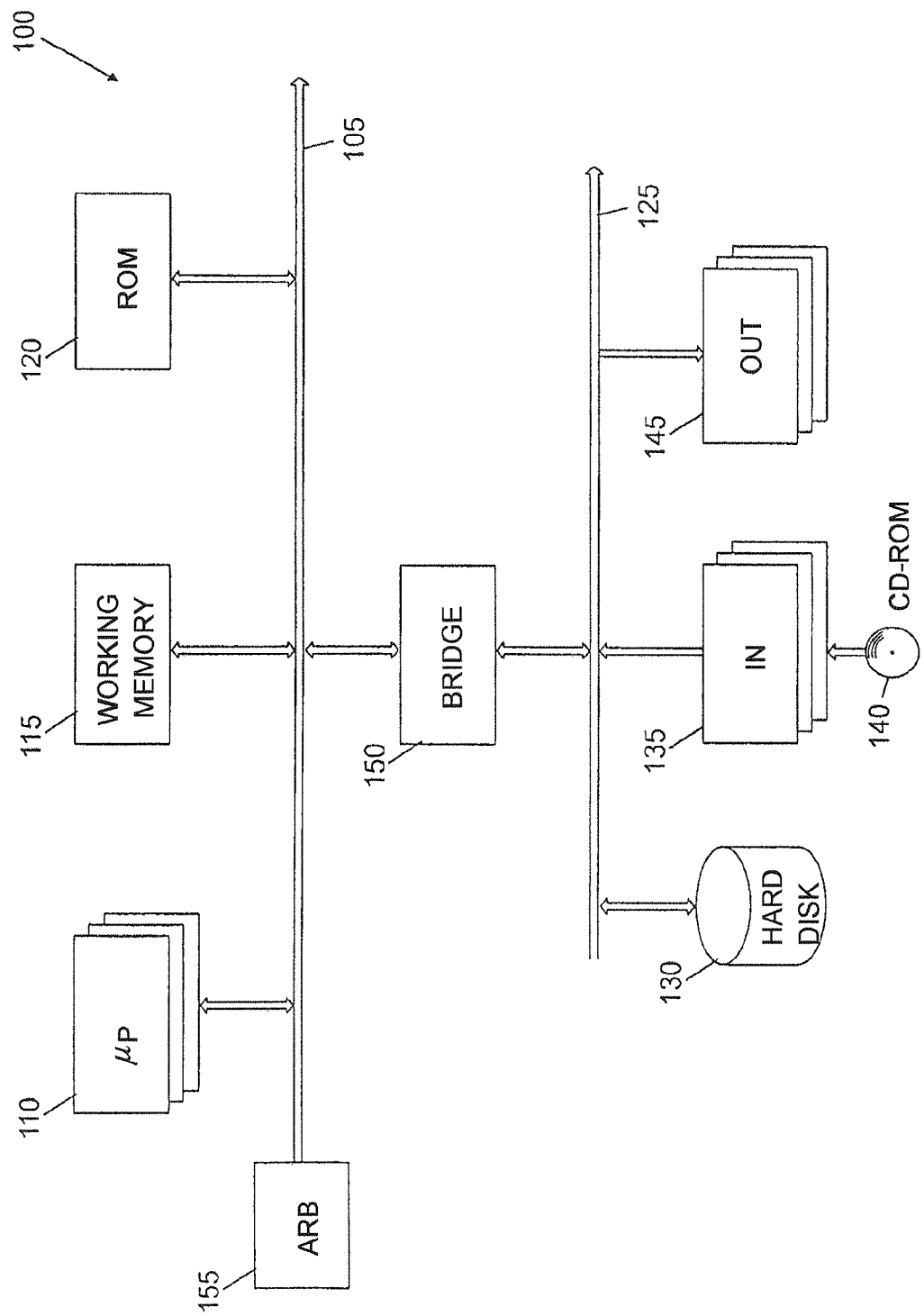
FIG. 1 is basic block diagram of a data processing system in which the scheduling method of the invention can be used.

With reference in particular to FIG. 1, there is shown a data processing system 100, for example a mainframe. The system 100 includes several units, which are connected in parallel to a system bus (SYS_BUS) 105. Particularly, multiple microprocessors (µP) 110 control operation of the system 100. The microprocessors 110 access a shared working memory 115, generally formed by a DRAM with interleaved modules; a read-only memory (ROM) 120 stores a basic program for starting the system 100.

Various peripheral units are clustered around a local bus (LOC_BUS) 125. More specifically, a bulk memory consists of a hard-disk 130; the system 100 further includes input units (IN) 135, which consist for example of keyboards and drivers for CD-ROMs 140, and output units (OUT) 145, which consist for example of monitors and printers. A bridge unit (BRIDGE) 150 interfaces the system bus 105 with the local bus 125.

Each microprocessor 105 and the bridge unit 150 can operate as master agents requesting an access to the system bus 105 for transmitting information. The granting of the access with mutual exclusion to the system bus 105 is managed by an arbiter (ARB) 155.

Similar considerations apply if the system has a different structure (for example with a single bus), if it consists of a mini-computer or a network of workstations, if it includes different units (such as drivers for magnetic tapes), and so on.

Figure 2:
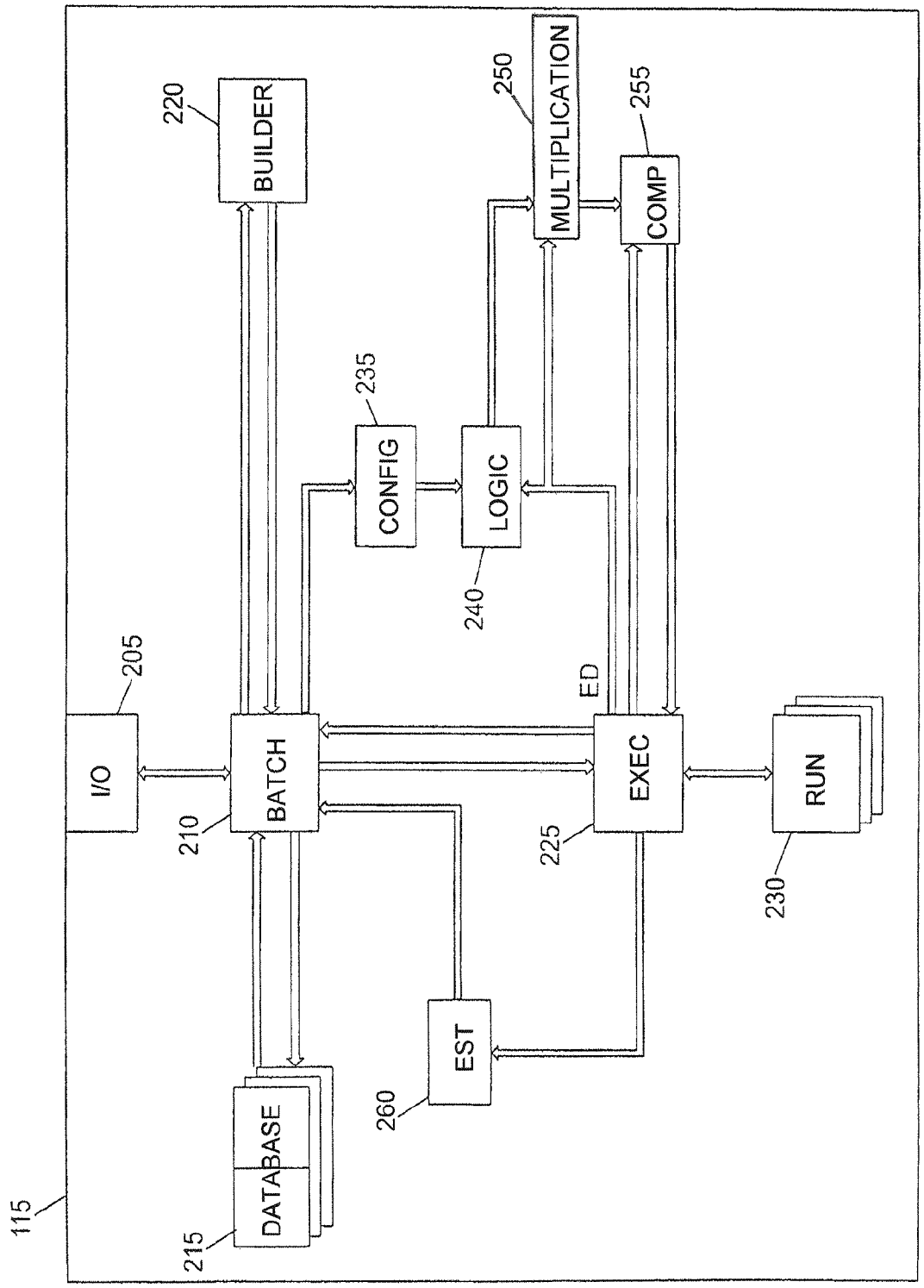
FIG. 2 shows a partial content of a working memory of the system.

Considering now FIG. 2, there is shown a partial content of the working memory 115 of the system in operation; the information (programs and data) is typically stored on the hard-disk and loaded (at least partially) into the working memory when the programs are running, together with an operating system and other application programs (not shown in the figure). The programs are initially installed onto the hard disk from CD-ROM.

The working memory 115 includes an input/output interface (I/O) 205, which is used for exchanging information with an operator. The input/output interface 205 communicates with a batch controller (BATCH) 210. The batch controller 210 manages execution of a series of non-interactive jobs (typically during the evening or whenever the system is idle); batch processing is particularly useful for operations that require the system or a peripheral device for an extended period of time.

The batch controller 210 accesses a database 215, which stores a description of an enterprise production workload. The workload database 215 includes a record (accessed through a respective identifier code) for each job of a batch to be executed on the system. The record is composed of a field (JOB) that describes the operations of the job, a planned time of execution (hour, day, week and month), and any dependency from other jobs. In fact, although the system may execute multiple jobs in parallel by a time-sharing technique, several jobs often feature sequential constraints. For example, when a resource (such as a file) to be used by a job is being accessed by another job, it is required that the execution of the job should not be started until after the execution of the other job is completed. The record further includes a field (ED) indicating an estimated duration of the job.

The description of the jobs to be executed and their estimated duration are provided to the batch controller 210, and then transmitted to a plan builder (BUILDER) 220. The builder 220 creates a scheduling plan for controlling a flow of execution of the jobs in a determined sequence for a specified period; the plan is built according to a pre-set scheduling strategy (for example to balance a system load or to optimise a peak performance). The plan is supplied, through the batch controller 210, to a plan executor (EXEC) 225. The plan executor 225 submits the batch in a production environment (RUN) 230, and controls running of the jobs accordingly.

The batch controller 210 further manages entering of parameters in a configuration repository (CONFIG) 235. The configuration parameters stored in the repository 235 are supplied to a logic unit (LOGIC) 240; the logic unit 240 further receives the estimated duration ED of each current job from the batch controller 210. The logic unit 240 calculates a multiplication factor (MF) for the current job, as described in the following. The multiplication factor MF and the estimated duration ED are input to a multiplication block 250; the multiplication block 250 calculates a corresponding threshold value (TH) for the current job, which is supplied to a comparator block (COMP) 255. The comparator block 255 further receives a current duration (CD) of the job; the current duration CD is measured by the plan executor 225 subtracting an actual start time of the job from a current time (provided by a system clock). The comparator block 255 detects any abnormal condition resulting from the job running longer than it is expected to do, and notifies the plan executor 225 accordingly; the abnormal condition is further reported to the operator, through the batch controller 210 and the input/output interface 205.

Once a job terminates its execution (because all the operations have been completed, because it has been cancelled by the operator in response to an abnormal condition, or because an error has occurred), feedback information is returned to the batch controller 210 from the plan executor 225, and then to the input/output interface 205; the feedback information includes an actual start time of the job, an actual end time of the job, a return code specifying the result of the operations, and the like. The plan executor 225 also measures an actual duration of the job (AD) by subtracting the actual start time from the actual end time.

The actual duration AD is fed into an estimation module (EST) 260; the estimation module 260 uses the actual duration AD for predicting how long the job should run in the future.

An algorithm is applied to weight the actual duration AD of each run and to create a continually evolving average for the duration of the job; particularly, the actual duration AD is multiplied by a factor with a value decreasing according to the number of runs of the job, and the result is used for revising the current estimated duration. The revised estimated duration ED is provided to the batch controller 210, and then stored in the corresponding record of the workload database 215.

Similar considerations apply if a whole scheduling program (consisting of the different modules described above) and the data are structured in a different manner, for example if the workload database and the configuration repository consist of a single inventory or they are replaced by equivalent memory structures, if different functions are provided, if the estimated duration is predicted in a different manner (for example accumulating the actual duration of each completed instance of the job and calculating its actual running average), and so on.

Figure 3:
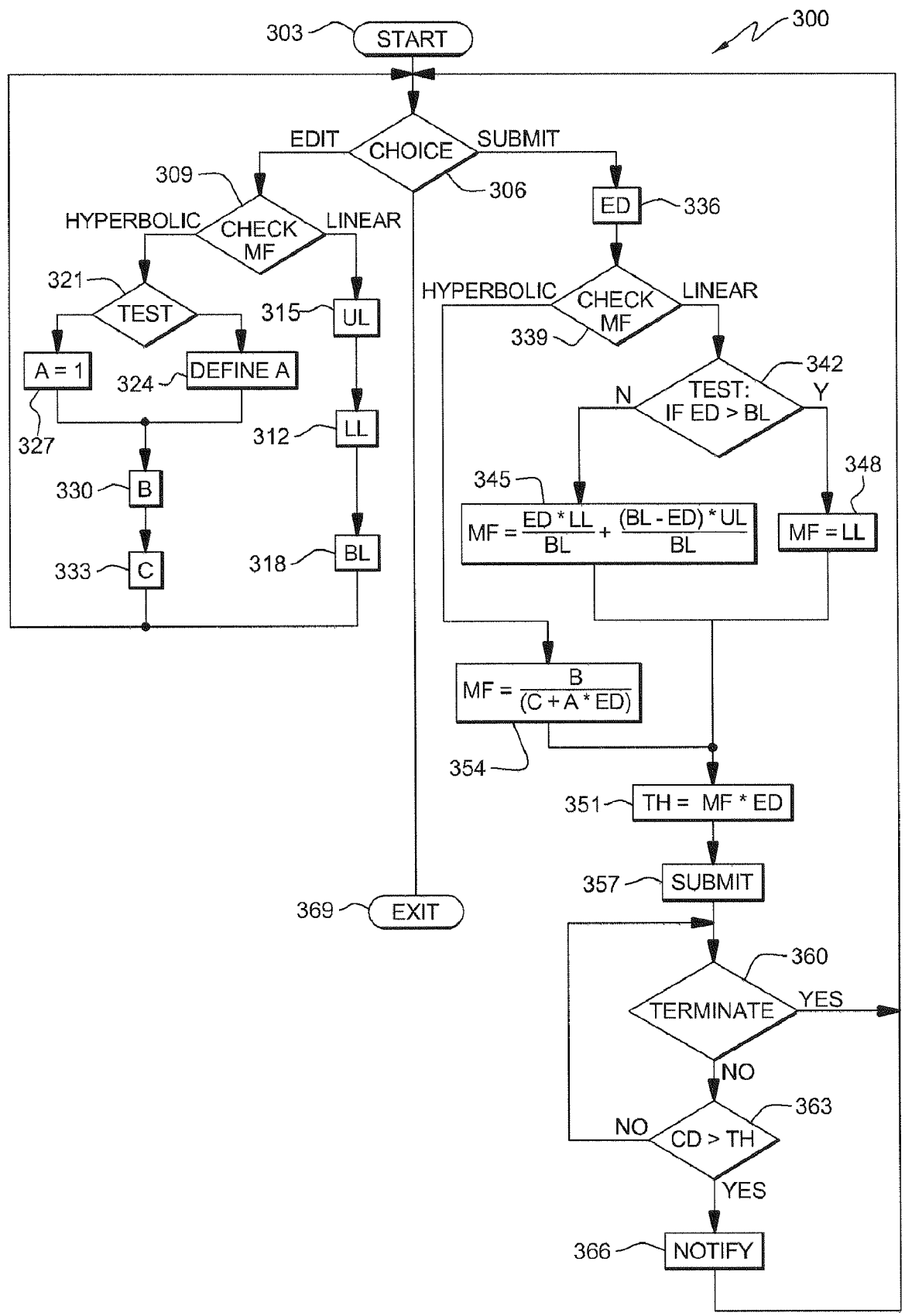
FIG. 3 is a flow chart of the scheduling method implemented in the system.

With reference now to FIG. 3, the scheduling program (when running on the system) performs a method 300 that starts at block 303. The method then passes to block 306, wherein a menu with a series of possible choices is displayed on the monitor of the system. The method carries out the operations corresponding to the selected choice. Particularly, if the operator has selected the function of editing the configuration parameters the blocks 309-333 are executed, whereas if the operator has selected the function of submitting a job the blocks 336-366 are executed; otherwise, if the operator has selected an exit option, the method ends at the final block 369.

Considering now block 309 (edit function), the method checks how the multiplication factor MF is defined. If the multiplication factor MF is calculated as a linear function of the estimated duration ED, the method passes to block 312. The operator inputs an upper level UL of the multiplication factor, which is associated with short-duration jobs. Proceeding to block 315, the operator inputs a lower level LL of the multiplication factor (with LL<UL), which is associated with long-duration jobs. The method descends into block 318, wherein the operator inputs a break limit BL for the multiplication factor; the break limit BL defines how fast the multiplication factor will swing between the upper level UL and the lower level LL; moreover, it is also used as a cap for levelling off the multiplication factor. The method then returns to block 306 waiting for a new command.

Referring back to block 309, if the multiplication factor MF is calculated as a hyperbolic function of the estimated duration ED, the method passes to the test block 321. If the operator wishes to define a scale coefficient A (for updating a concavity of the hyperbola), the method passes to block 324, wherein the operator inputs the scale coefficient A; otherwise, the scale coefficient is set to a constant value of 1 at block 327. In both cases, the operator inputs a parameter B at block 330 and a further parameter C at block 333; the ratio between the parameters B and C defines an upper level of the multiplication factor for short-duration jobs. The method then returns to block 306.

With reference now to block 336 (submit function), the estimated duration ED of the current job is provided to the logic unit. The logic unit checks at block 339 how the multiplication factor MF is defined. If the multiplication factor MF is calculated as a linear function of the estimated duration ED, the method passes to the test block 342. If the estimated duration ED is greater than the break limit BL, the multiplication factor MF is set to the lower level LL (MF=LL) at block 348. Conversely, the multiplication factor MF is calculated as a linear interpolation between the upper level UL for the expected duration ED=0 and the lower level LL for the expected duration ED=BL, that is:

$$MF = \frac{ED \cdot LL}{BL} + \frac{(BL - ED) \cdot UL}{BL}$$

In both cases, the method then descends into block 351 (described in the following).

For example, let us suppose that the operator decides to choose a value of 3 for the upper level UL (i.e., really short-duration jobs are late when they run three times longer then their estimated duration), and a value of 0.1 for the lower level LL (i.e., really long-duration jobs are late when they run 10% over their estimated duration); moreover, the multiplication factor MF should be levelled off at 0.1 for any estimated duration over 24 hours (BL=1440 minutes). In this case, a 1-minute job will be considered late if it runs for 2.997986 minutes (i.e., the algorithm has given a lot of weight to the upper level UL); a 24-hours job will be considered late if it runs for 1584 minutes (1440+10%). Some intermediate examples explain how the multiplication factor MF changes with the estimated duration ED:

| ED (minutes) | MF |
| --- | --- |
| 60 | 2.88 |
| 240 | 2.52 |
| 480 | 2.03 |
| 720 | 1.55 |
| 960 | 1.07 |
| 1,200 | 0.58 |
| 1,380 | 0.22 |

Figure 4A:
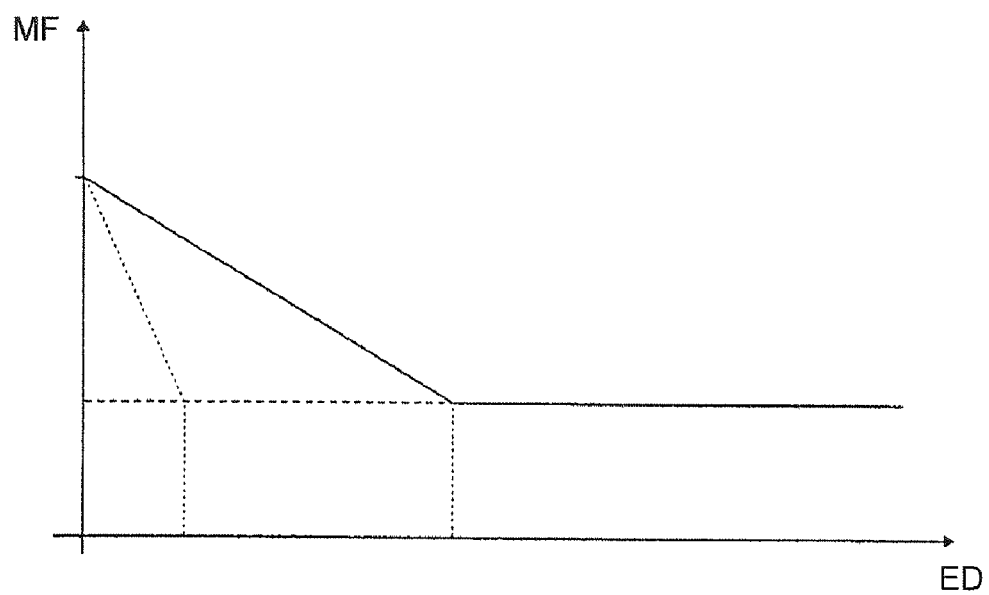
FIGS. 4a-4b depict different curves of a function multiplication factor/estimated duration.

The corresponding curve graphically showing how the multiplication factor MF changes with the estimated duration ED is depicted with a solid line in FIG. 4a.

In a different example, the operator sets the break limit BL=240 minutes (4 hours). In this case, the multiplication factor MF would reduce steadily and then level off at 4 hours and above into a constant of 0.1:

| ED (minutes) | MF |
| --- | --- |
| 60 | 2.32 |
| 120 | 1.55 |
| 180 | 0.82 |
| 240 | 0.1 |
| 300 | 0.1 |
| 360 | 0.1 |
| 360 | 0.1 |

The corresponding curve is shown with a dashed line in FIG. 4a.

Referring back to block 339, if the multiplication factor MF is calculated as a hyperbolic function of the estimated duration ED the method passes to block 354, wherein the multiplication factor MF is defined by the following formula:

$$MF = \frac{B}{(C + A \cdot ED)}$$

The method then descends into block 351.

For example, using A=1, B=500 and C=100 we get the following values over a 12-hour period:

| ED (minutes) | MF |
| --- | --- |
| 60 | 3.12 |
| 120 | 2.27 |
| 180 | 1.79 |
| 240 | 1.47 |
| 300 | 1.25 |
| 360 | 1.08 |
| 420 | 0.96 |
| 480 | 0.86 |
| 540 | 0.78 |
| 600 | 0.71 |

Figure 4B:
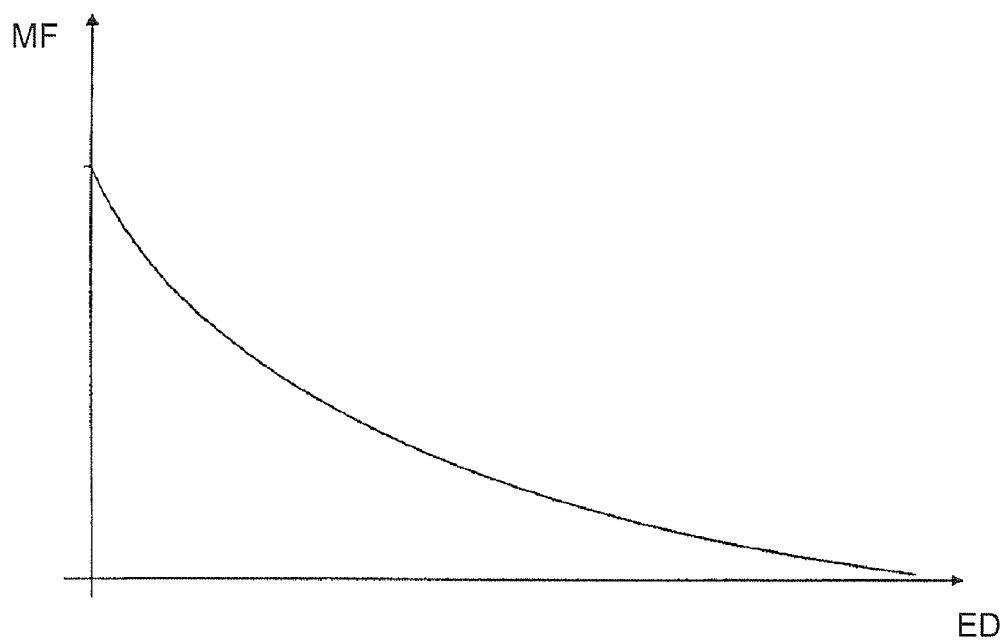

The corresponding curve graphically showing how the multiplication factor MF changes with the estimated duration ED is depicted in FIG. 4b.

Considering now block 351, the threshold value TH is calculated multiplying the estimated duration ED by the factor MF, that is TH=MF·ED. The job is submitted at block 357; the method then verifies whether execution of the job has terminated at block 360. If so, the method returns to block 306 waiting for a new command. Otherwise, the test block 363 is entered. If the current duration CD of the job exceeds the threshold value TH, an abnormal condition is detected at block 366 and the operator is accordingly notified; the method then returns to block 306. In the contrary situation, the method returns to block 360 for repeating the operations described above.

Similar considerations apply if the program performs an equivalent method, for example with error routines, exception handling functions for overriding the multiplication factor at the operation level, monitoring routines for tracking the jobs, and the like. Alternatively, the method is used to control system resources in a distributed computer network, or any other process in different applications.

More generally, the present invention provides a scheduling method for controlling execution of processes. The method estimates an expected duration of a process; a threshold value is then determined by applying a multiplication factor to the expected duration. The process is run, and an abnormal condition is detected when an actual duration of the process exceeds the threshold value. In the method of the invention, the multiplication factor is determined as a decreasing function of the expected duration.

The devised solution results in a very accurate detection of any long running job. This improves operation of the workload scheduler. As a consequence, any alarm raised by the workload scheduler always indicates a real abnormal condition, due to a job running significantly longer than it is supposed to do; the system resources may also be used correctly by the workload manager for critical jobs that actually run longer than their estimated duration.

In fact, the inventors have discovered that a pre-set value of the multiplication factor is not acceptable in a common scenario, wherein each batch consists of jobs of very different duration.

For instance, a small multiplication factor is desirable for detecting an abnormal condition for a long-duration job after a reasonable amount of time. However, in this case a (supposed) abnormal condition for a short-duration job may be detected after the job overruns by only a few seconds (something that is very often caused by minor perturbations that affect shorter jobs relatively more).

On the other hand, a high multiplication factor results in a threshold value that may be acceptable for a short-duration job. Unfortunately, in this case an abnormal condition for a long-duration job is only detected after many hours.

In sharp contrast, the solution of the invention uses a method for detecting long-running jobs that allows for the inherent volatility of short-duration jobs, but that also allows the detection of any abnormal condition for long-duration jobs before too much time has passed.

The preferred embodiment of the invention described above offers further advantages. For example, the multiplication factor is calculated in a very simple manner as a linear function of the expected duration (for at least a range of values thereof).

Preferably, the function is defined by the lower level LL, the upper level UL and the break limit BL. This particular algorithm is useful as the parameters are very meaningful for the operator, who codes the highest value and the lowest value that he or she wants for the multiplication factor MF. In this way, the algorithm calculates the appropriate multiplication factor MF for any particular job, giving much more weight to the upper level UL when the estimated duration ED is small, but which gradually swings the levels to give more importance to the lower level LL when the estimated duration ED is long.

Moreover, the multiplication factor MF levels off at the break limit BL and above into a constant defined by the lower level LL. This allows the multiplication factor MF to be reduced steadily form the upper level UL to the lower level LL, and to be maintained at an acceptable level for very long-duration jobs at the same time.

Alternatively, the multiplication factor MF is calculated as a hyperbolic function of the estimated duration ED. In this way, the curve of the multiplication factor MF may be manipulated to the desired shape (even if the coefficients are not very meaningful to the operator, so that it is more difficult to understand what the best values are).

Preferably, the curvature of the hyperbola is further defined by the operator, so as to add more flexibility to the solution.

Similar considerations apply if the threshold value is determined in a different manner, if different parameters are envisaged, and the like. Alternatively, no breaking limit is used in the linear function, the multiplication factor is calculated with different functions, such as a logarithmic one, an exponential one, or more generally with any decreasing function of the estimated duration. Moreover, the solution according to the invention leads itself to be implemented even determining the multiplication factor with a pre-set table or with any other method providing the above-described logic.

Advantageously, the solution according to the present invention is implemented with a computer program (software), which is provided on CD-ROM.

Alternatively, the program is provided on floppy-disk or tape, is pre-loaded onto the hard-disk, or is stored on any other computer readable medium, is sent to the system through a network (typically the INTERNET), is broadcast, or more generally is provided in any other form directly loadable into a working memory of the computer. In addition, the method according to the present invention leads itself to be carried out even with a hardware structure, for example integrated in a chip of semiconductor material.

The invention claimed is:

1. A computer-implemented scheduling method for controlling execution of processes, said computer-implemented scheduling method comprising:
   estimating an expected duration of execution of a process;
   determining a multiplication factor for the process, wherein the determining comprises:
       determining whether the multiplication factor is to be calculated as a linear function of the estimated expected duration or as a hyperbolic function of the estimated expected duration;
   if the multiplication factor is to be calculated as a linear function:
       setting a first level of the multiplication factor for short-duration processes;
       setting a second level of the multiplication factor for long-duration processes, wherein the second level is lower than the first level;
       setting a break limit for the multiplication factor defining a speed at which the multiplication factor swings between the first level and the second level; and
       setting the multiplication factor based on a relationship between the estimated expected duration and the break limit;
   if the multiplication factor is to be calculated as a hyperbolic function:
       setting a scale coefficient;
       providing a first parameter and a second parameter for use in determining the multiplication factor; and
       setting the multiplication factor based on the scale coefficient, the first parameter, the second parameter and the estimated expected duration;
   determining a threshold value for current duration of the process by applying the multiplication factor to the estimated expected duration;
   running the process;
   detecting an abnormal condition when an actual duration of the process exceeds the threshold value; and
   performing an action, in response to detecting the abnormal condition.

2. The computer-implemented scheduling method of claim 1 wherein the setting the multiplication factor (MF) based on the relationship comprises:
   determining whether the estimated expected duration (ED) is greater than the break limit (BL);
   setting the multiplication factor to the second level (LL), in response to determining the estimated expected duration is greater than the break limit; and
   calculating the multiplication factor as a linear interpolation between the first level (UL) and the second level, in response to determining the estimated expected duration is not greater than the break limit.

3. The computer-implemented scheduling method of claim 2 wherein the calculating comprises using the following equation:

$$MF = \frac{ED * LL}{BL} + \frac{(BL - ED) * UL}{BL}.$$

4. The computer-implemented scheduling method of claim 1, wherein the setting the scale coefficient comprises one of inputting a desired scale coefficient or setting the scale coefficient to a constant value of one.

5. The computer-implemented scheduling method of claim 1, wherein a ratio between the first parameter and the second parameter defines an upper level of the multiplication factor for short-duration processes.

6. The computer-implemented scheduling method of claim 1, wherein the setting the multiplication factor (MF), in response to the multiplication factor being calculated as a hyperbolic function, comprises using the following equation:

$$MF = \frac{\text{first parameter}}{\text{second parameter} + \text{scale coefficient} * \text{estimated expected duration}}.$$

* * * * *